United States Patent
Kwon et al.

(10) Patent No.: US 12,404,562 B2
(45) Date of Patent: Sep. 2, 2025

(54) ORIENTED ELECTRICAL STEEL SHEET AND METHOD FOR MANUFACTURING SAME

(71) Applicant: POSCO, Pohang-si (KR)

(72) Inventors: Oh-Yeoul Kwon, Pohang-si (KR); Woo-Sin Kim, Pohang-si (KR); Jong-Tae Park, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 377 days.

(21) Appl. No.: 17/297,917

(22) PCT Filed: Nov. 26, 2019

(86) PCT No.: PCT/KR2019/016379
§ 371 (c)(1),
(2) Date: May 27, 2021

(87) PCT Pub. No.: WO2020/111735
PCT Pub. Date: Jun. 4, 2020

(65) Prior Publication Data
US 2022/0042126 A1  Feb. 10, 2022

(30) Foreign Application Priority Data
Nov. 30, 2018  (KR) .................. 10-2018-0153118

(51) Int. Cl.
*C21D 9/46*  (2006.01)
*C21D 8/02*  (2006.01)
(Continued)

(52) U.S. Cl.
CPC ......... *C21D 8/1283* (2013.01); *C21D 8/0205* (2013.01); *C21D 8/0236* (2013.01);
(Continued)

(58) Field of Classification Search
CPC ...... C21D 8/0236; C21D 8/1244; C21D 9/46; C21D 2201/05; C21D 8/1277; C21D 8/1283; C22C 38/00; C23C 22/77
See application file for complete search history.

(56) References Cited

U.S. PATENT DOCUMENTS 4,904,312 A  2/1990  Beckley et al.
8,920,581 B2  12/2014  Natori et al.
(Continued)

FOREIGN PATENT DOCUMENTS

CN  106944743 A  7/2017
CN  106282512 B  3/2018
(Continued)

OTHER PUBLICATIONS

Extended European Search Report dated Jul. 21, 2021 issued in European Patent Application No. 19888737.4.
(Continued)

*Primary Examiner* — Jie Yang
(74) *Attorney, Agent, or Firm* — Morgan Lewis & Bockius LLP

(57) ABSTRACT

An embodiment of the present invention provides a grain-oriented electrical steel sheet, including a groove including a bottom portion and a side portion positioned on a surface of the electrical steel sheet, a metal oxide layer positioned on the groove, and an insulating layer positioned on the metal oxide layer, wherein the steel sheet includes a normal groove in which thicknesses of the metal oxide layer positioned on the bottom portion and the side portion exceed 0.5 μm, and a defective groove in which thicknesses of the metal oxide layer positioned on the bottom portion and the side portion are 0.5 μm or less, the insulating layer positioned on the
(Continued)

normal groove has a thickness of 0.5 µm to 1.5 µm, and the insulating layer positioned on the defective groove has a thickness of 1.5 to 10 µm.

15 Claims, 7 Drawing Sheets

(51) Int. Cl.
  *C21D 8/12* (2006.01)
  *C22C 38/00* (2006.01)
(52) U.S. Cl.
  CPC ............ *C21D 8/1244* (2013.01); *C21D 9/46* (2013.01); *C22C 38/00* (2013.01)

(56) References Cited

U.S. PATENT DOCUMENTS

| | | | |
|---|---|---|---|
| 2013/0139932 A1 | 6/2013 | Sakai et al. | |
| 2013/0177743 A1 | 7/2013 | Watanabe et al. | |
| 2013/0189490 A1 | 7/2013 | Watanabe et al. | |
| 2017/0263357 A1 | 9/2017 | Senda et al. | |
| 2017/0369960 A1 | 12/2017 | Kwon et al. | |
| 2018/0010206 A1* | 1/2018 | Kwon | .................. C22C 38/001 |

FOREIGN PATENT DOCUMENTS

| | | | | |
|---|---|---|---|---|
| CN | 107922987 A | 4/2018 | | |
| CN | 108660295 A | 10/2018 | | |
| CN | 108660303 B | 3/2020 | | |
| EP | 0589418 A1 | 3/1994 | | |
| EP | 2843069 A1 | 3/2015 | | |
| EP | 3239325 A1 | 11/2017 | | |
| EP | 3287533 A1 * | 2/2018 | ........... B23K 26/364 | |
| JP | 2002-220642 A | 8/2002 | | |
| JP | 2003-129135 A | 5/2003 | | |
| JP | 2011-511152 A | 4/2011 | | |
| JP | 2012-077347 A | 4/2012 | | |
| JP | 5793859 B2 | 10/2015 | | |
| JP | 5884944 B2 | 3/2016 | | |
| JP | 2017-095745 A | 6/2017 | | |
| JP | 2017-122264 A | 7/2017 | | |
| JP | 2017-125250 A | 7/2017 | | |
| JP | WO2016/171130 A1 | 12/2017 | | |
| JP | 2018-035412 A | 3/2018 | | |
| JP | 2018-508645 A | 3/2018 | | |
| JP | 2018-508647 A | 3/2018 | | |
| JP | 2018-131680 A | 8/2018 | | |
| KR | 10-2008-0010454 A | 1/2008 | | |
| KR | 10-1345469 B1 | 12/2013 | | |
| KR | 10-2016-0078242 A | 7/2016 | | |
| KR | 10-2016-0078247 A | 7/2016 | | |
| KR | 2016078247 A * | 7/2016 | ......... B23K 26/0622 | |
| KR | 10-1751525 B1 | 7/2017 | | |
| KR | 10-2018-0073306 A | 7/2018 | | |
| KR | 10-2018-0073343 A | 7/2018 | | |
| KR | 10-1881708 B1 | 7/2018 | | |
| KR | 10-1884429 B1 | 8/2018 | | |
| KR | 10-2018-0108838 A | 10/2018 | | |
| KR | 10-1962055 B1 | 3/2019 | | |
| KR | 10-2008600 B1 | 8/2019 | | |
| KR | 10-2010165 B1 | 8/2019 | | |
| KR | 10-2010166 B1 | 8/2019 | | |
| WO | 2013/160955 A1 | 10/2013 | | |

OTHER PUBLICATIONS

Written Opinion and International Search Report dated Jul. 30, 2020 issued in International Patent Application No. PCT/KR2019/016379 (with English translation).

Japanese Office Action dated Jun. 4, 2024 issued in Japanese Patent Application No. 2021-531298.

* cited by examiner

ORIENTED ELECTRICAL STEEL SHEET AND METHOD FOR MANUFACTURING SAME

CROSS-REFERENCE OF RELATED APPLICATIONS

This application is the U.S. National Phase under 35 U.S.C. § 371 of International Patent Application No. PCT/KR2019/016379, filed on Nov. 26, 2019, which in turn claims the benefit of Korean Application No. 10-2018-0153118, filed on Nov. 30, 2018, the entire disclosures of which applications are incorporated by reference herein.

TECHNICAL FIELD

The present invention relates to a grain-oriented electrical steel sheet and a manufacturing method thereof. More specifically, the present invention relates to a grain-oriented electrical steel sheet and a manufacturing method of a grain-oriented electrical steel sheet in which magnetism and hot-rolling properties are improved by controlling a thickness of an insulating film layer formed on a groove according to a thickness of a forsterite layer.

BACKGROUND ART

In order for a grain-oriented electrical steel sheet to be used as a high-efficiency transformer core, it is desirable to use an iron core material having excellent iron loss and insulating properties of the electrical steel sheet so that loss of electronic devices may be minimized.

The grain-oriented electrical steel sheet is oriented in a Goss orientation ({110}<001>) along a rolling direction through steelmaking, hot-rolling, cold-rolling, and annealing processes, and thus it is a functional steel sheet for electronic devices with an anisotropy property that iron loss properties in a rolling direction are superior to that of a rolling vertical direction. Particularly, a magnetic domain refinement technology in the grain-oriented electrical steel sheet is a technology that improves iron loss by reducing a magnetic domain width of 180° in secondary crystal grains when a magnetic field is applied, wherein in order to improve efficiency of a core of a transformer, it is necessary to minimize a stray field by improving insulating properties of a sheet with low iron loss and insulating properties when stacking sheets. That is, when a steel sheet with low iron loss is laminated, and when the stray field increases due to inferior insulating properties of the sheet, an excitation voltage of an iron core increases, and thus it is not preferable because energization of a designed magnetic flux density or more is required.

DISCLOSURE

A grain-oriented electrical steel sheet and a manufacturing method thereof are provided. More specifically, a grain-oriented electrical steel sheet and a manufacturing method of a grain-oriented electrical steel sheet in which magnetism and hot-rolling properties are improved by controlling a thickness of an insulating film layer formed on a groove according to a thickness of a forsterite layer are provided.

An embodiment of the present invention provides a grain-oriented electrical steel sheet, including a groove including a bottom portion and a side portion positioned on a surface of the electrical steel sheet, a metal oxide layer positioned on the groove, and an insulating layer positioned on the metal oxide layer, wherein the steel sheet includes a normal groove in which thicknesses of the metal oxide layer positioned on the bottom portion and the side portion exceed 0.5 µm, and a defective groove in which thicknesses of the metal oxide layer positioned on the bottom portion and the side portion are 0.5 µm or less, the insulating layer positioned on the normal groove has a thickness of 0.5 µm to 4.0 µm, and the insulating layer positioned on the defective groove has a thickness of 1.5 to 10 µm.

The defective groove may include a side defective groove having a defective portion on the side portion and a bottom defective groove having a defective portion on the bottom portion, the insulating layer positioned on the side defective groove may have a thickness of 1.5 to 6 µm, and the insulating layer positioned on the bottom defective groove may have a thickness of 2.0 to 10 µm.

The insulating layer positioned on the side portion of the normal groove may have a thickness of 0.5 µm to 2.0 µm, and the insulating layer positioned on the bottom portion of the normal groove may have a thickness of 1.0 µm to 4.0 µm.

The insulating layer positioned on the side portion of the side defective groove may have a thickness of 1.5 µm or more and less than 4.0 µm, and the insulating layer positioned on the bottom portion of the side defective groove may have a thickness of 4.0 µm to 6.0 µm.

The insulating layer positioned on the side portion of the bottom defective groove may have a thickness of 2.0 µm or more and less than 5.0 µm, and the insulating layer positioned on the bottom portion of the bottom defective groove may have a thickness of 5.0 µm to 10.0 µm.

The steel sheet may be divided into several zones in a rolling vertical direction, and the insulating layer may be formed to have a corresponding thickness in each zone according to a thickness of a metal oxide layer positioned on a groove included in each zone.

The steel sheet may be divided into several zones in a rolling direction, and the insulating layer may be formed to have a corresponding thickness in each zone according to a thickness of a metal oxide layer positioned on a groove included in each zone.

The bottom portion of the groove may be a depth portion of 0.7 or more of an entire depth of the groove, and the side portion of the groove may be a depth portion of less than 0.7 of the entire depth of the groove.

The defective grooves may be 10 to 80% of all the grooves of the steel sheet.

The grooves may be linearly formed, and 2 to 10 grooves may be intermittently positioned in a rolling vertical direction.

The grooves may be linearly formed, and may form an angle of 75 to 88° with respect to a rolling vertical direction.

A depth of the groove may be 3 to 30 µm.

Another embodiment of the present invention provides a manufacturing method of a grain-oriented electrical steel sheet, including: manufacturing a cold-rolled sheet; forming a groove including a bottom portion and a side portion on a surface of the cold-rolled sheet; applying an annealing separator to the cold-rolled sheet and annealing it at a high temperature to form a metal oxide layer; measuring a thickness of a metal oxide layer positioned on the bottom portion and the side portion of the groove; and forming an insulating layer by adjusting and applying viscosity of an insulating layer-forming composition according to the measured thickness of the metal oxide layer.

In the forming of the insulating layer, in a case of a normal groove in which the thickness of the metal oxide layer positioned on the bottom and side portions thereof exceeds 0.5 μm, the viscosity of the insulating layer-forming composition may be adjusted to be more than 80 cps; and in a case of a defective groove with a defective portion in which the thickness of the metal oxide layer positioned on the bottom and side portions thereof is 0.5 μm or less, the viscosity of the insulating layer-forming composition may be adjusted to be 80 cps or less.

In the forming of the insulating layer, in a case of a side defective groove with a defective portion in which the thickness of the metal oxide layer positioned on the side portion thereof is 0.5 μm or less, the viscosity of the insulating layer-forming composition may be adjusted to be 20 to 80 cps; and in a case of a bottom defective groove with a defective portion in which the thickness of the metal oxide layer positioned on the bottom portion thereof is 0.5 μm or less, the viscosity of the insulating layer-forming composition may be adjusted to be less than 20 cps.

In the measuring of the thickness of the metal oxide layer, the thickness may be measured by dividing a zone thereof in a rolling vertical direction; and in the forming of the insulating layer, a zone thereof may be divided in a rolling vertical direction to apply an insulating layer-forming composition.

In the measuring of the thickness of the metal oxide layer, the thickness may be measured by dividing a zone thereof in a rolling direction; and in the forming of the insulating layer, a zone thereof may be divided in a rolling direction to apply an insulating layer-forming composition.

According to the embodiment of the present invention, even if a defect occurs in a metal oxide layer, it is possible to improve an insulating property by forming an insulating layer in an appropriate thickness.

In addition, according to the embodiment of the present invention, even when a defect does not occur in a metal oxide layer, it is possible to improve a stacking factor by forming an insulating layer in an appropriate thickness.

MODE FOR INVENTION

It will be understood that, although the terms first, second, third, etc. may be used herein to describe various elements, components, regions, areas, zones, layers, and/or sections, they are not limited thereto. These terms are only used to distinguish one element, component, region, area, zone, layer, or section from another element, component, region, layer, or section. Therefore, a first part, component, region, area, zone, layer, or section to be described below may be referred to as second part, component, area, layer, or section within the range of the present invention.

The technical terms used herein are to simply mention a particular embodiment and are not meant to limit the present invention. An expression used in the singular encompasses an expression of the plural, unless it has a clearly different meaning in the context. In the specification, it is to be understood that the terms such as "including", "having", etc., are intended to indicate the existence of specific features, regions, numbers, stages, operations, elements, components, and/or combinations thereof disclosed in the specification, and are not intended to preclude the possibility that one or more other features, regions, numbers, stages, operations, elements, components, and/or combinations thereof may exist or may be added.

When referring to a part as being "on" or "above" another part, it may be positioned directly on or above another part, or another part may be interposed therebetween. In contrast, when referring to a part being "directly above" another part, no other part is interposed therebetween.

Unless otherwise defined, all terms used herein, including technical or scientific terms, have the same meanings as those generally understood by those with ordinary knowledge in the field of art to which the present invention belongs. Terms defined in commonly used dictionaries are further interpreted as having meanings consistent with the relevant technical literature and the present disclosure, and are not to be construed as having idealized or very formal meanings unless defined otherwise.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Figure 1:
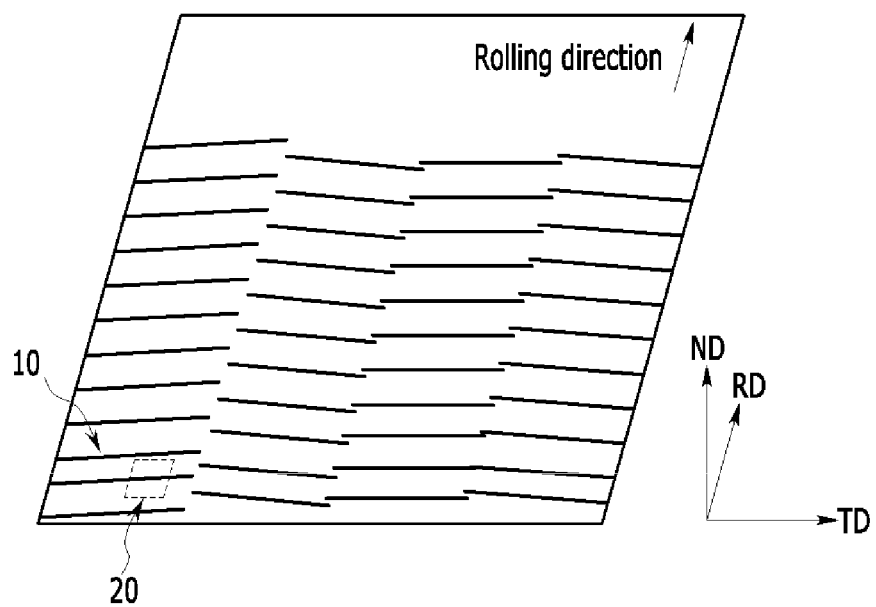
FIG. 1 illustrates a schematic view of a rolled surface (ND surface) of a grain-oriented electrical steel sheet according to an embodiment of the present invention.

FIG. 1 illustrates a schematic view of a grain-oriented electrical steel sheet 10 that is magnetic-domain-refined by an embodiment of the present invention.

Figure 2:
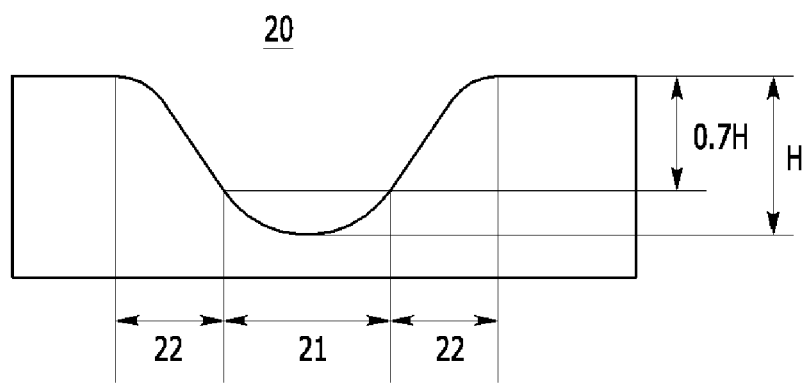
FIG. 2 illustrates a schematic view of a cross-section of a groove according to an embodiment of the present invention.

As shown in FIG. 2, a groove 20 including a bottom portion 21 and a side portion 22 is formed in a surface of a grain-oriented electrical steel sheet 10 according to an embodiment of the present invention.

Figure 3:
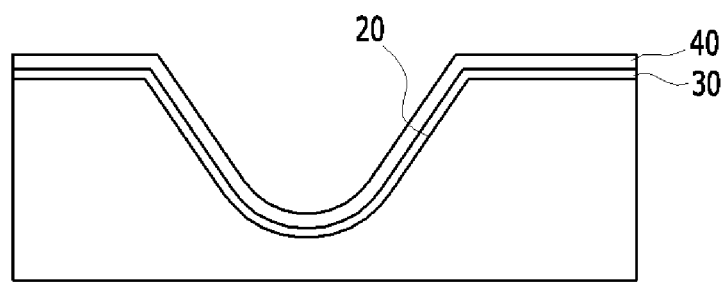
FIG. 3 illustrates a schematic view of a cross-section of a normal groove according to an embodiment of the present invention.

As shown in FIG. 3, a metal oxide layer 30 and an insulating layer 40 are sequentially positioned on the groove 20.

The metal oxide layer 30 is formed through a reaction of an annealing separator and an oxide layer on the surface of the steel sheet during a secondary recrystallization annealing process in a manufacturing process of the grain-oriented electrical steel sheet. It is desirable to uniformly form the metal oxide layer 30, but the metal oxide layer 30 is affected by various process variables, and thus it is difficult to uniformly form the metal oxide layer 30.

Furthermore, when the groove 20 is formed in the steel sheet as in the embodiment of the present invention, it is very difficult to form a uniform metal oxide layer 30 on the groove 20.

Since the metal oxide layer 30 is widely known, a detailed description thereof will be omitted. For example, the metal oxide layer 30 may be forsterite ($Mg_2SiO_4$).

As a result, in an actual process, a defect in which a thickness of the metal oxide layer 30 positioned on the groove 20 is partially thin occurs, and when the insulating layer 40 applied on the groove with the defect is formed in the same manner as the normal groove, a insulating property is considerably deteriorated in the groove with the defect. In addition, after assuming that a defective groove will be formed, it is also possible to consider forming a thick insulating layer 40 on the entire steel sheet, but in this case, a stacking factor is deteriorated.

In the embodiment of the present invention, by classifying the normal groove and the defective groove according to the thickness of the metal oxide layer 30, and forming insulating layers 40 having different thicknesses on respective grooves, it is possible to improve both the insulating property and the stacking factor.

Specifically, the normal groove and the defective groove may be classified as follows.

The normal groove means a groove in which thicknesses of the metal oxide layer 30 positioned on the bottom portion 21 and the side portion 22 are larger than 0.5 μm. An example of the normal groove is shown in FIG. 3. As shown in FIG. 3, the metal oxide layer 30 is uniformly formed on the bottom portion 21 and the side portion 22, and thus there are no defects having a thickness of 0.5 μm or less.

Figure 4:
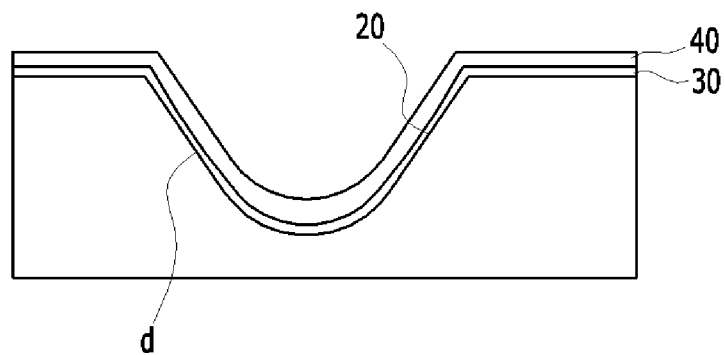
FIG. 4 illustrates a schematic view of a cross-section of a groove with a side defect according to an embodiment of the present invention.
Figure 5:
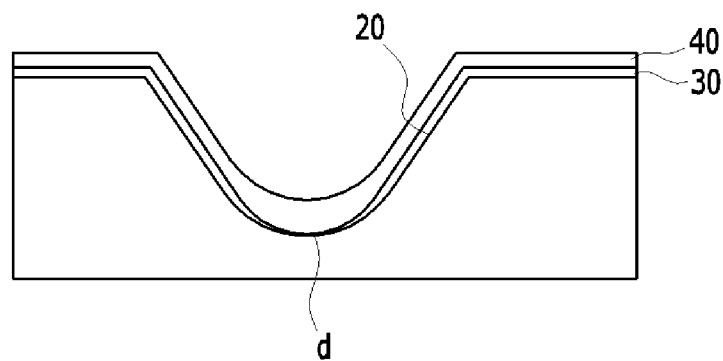
FIG. 5 illustrates a schematic view of a cross-section of a groove with a bottom defect according to an embodiment of the present invention.

Meanwhile, the defective groove means a groove having a defective portion (d) of which a thickness of the metal oxide layer positioned on the side portion 22 or the bottom portion 21 is 0.5 μm or less. Examples of the defective grooves are shown in FIG. 4 and FIG. 5. As shown in FIG. 4 and FIG. 5, there is the defective portion (d) on the side portion 22 or the bottom portion 21. The defective groove may be further classified into a side defective groove in which a defect (d) exists in the side portion 22 and a bottom defective groove in which the defect (d) exists in the bottom portion 21. The side defective groove is illustrated in FIG. 4 and the bottom defective groove is illustrated in FIG. 5. In the embodiment of the present invention, when defects (d) exist in both the bottom portion 21 and the side portion 22, they are classified as bottom defective grooves.

In the normal groove, since the metal oxide layer 30 is properly formed, the thickness of the insulating layer 40 does not need to be thick. Rather, when the thickness of the insulating layer 40 is too thick, the stacking factor may be deteriorated. The insulating layer positioned on the normal groove may have a thickness of 0.5 μm to 4.0 μm. Specifically, the insulating layer positioned on the normal groove may have a thickness of 0.5 μm or more and less than 1.5 μm. More specifically, the insulating layer positioned on the normal groove may have a thickness of 0.7 μm to 1.2 μm.

Since the defective groove has a defect in the metal oxide layer 30, the thickness of the insulating layer 40 must be thick. Specifically, the insulating layer positioned on the defective groove may have a thickness of 1.5 to 10 μm. More specifically, the insulating layer positioned on the defective groove may have a thickness of 3 to 7 μm. A thickness of the insulating layer 40 on the groove 20 may be varied even in the groove 20, and in the embodiment of the present invention, the thickness of the insulating layer 40 refers to an average thickness with respect to a width of the groove.

Among the defective grooves, the bottom defective groove must have a thicker insulating layer 40 to obtain an appropriate insulating property. Specifically, the insulating layer 40 positioned on the side defective groove may have a thickness of 1.5 to 6 μm, and the insulating layer 40 positioned on the bottom defective groove may have a thickness of 2.0 to 10 μm. Specifically, the insulating layer 40 positioned on the side defective groove may have a thickness of 2 to 4 μm, and the insulating layer 40 positioned on the bottom defective groove may have a thickness of 5 to 7 μm.

Even in normal and defective grooves, when the thickness of the bottom portion 21 is thicker than that of the side portion 22, the insulating property is improved. Specifically, the thickness of the insulating layer on the side portion 21 may be less than 20% of a groove depth (H). The thickness of the insulating layer on the bottom portion 21 may be 20 to 80% of the groove depth (H).

Specifically, the insulating layer positioned on the side portion 22 of the normal groove may have a thickness of 0.5 to 2.0 μm. More specifically, it may have a thickness of 0.5 μm or more and less than 1.5 μm. The insulating layer positioned on the bottom portion 21 of the normal groove may have a thickness of 1.5 μm to 4.0 μm. Specifically, it may have a thickness of 1.5 to 2.0 μm. More specifically, the insulating layer positioned on the side portion 22 of the normal groove may have a thickness of 0.6 μm to 1.0 μm, and the insulating layer positioned on the bottom portion 21 of the normal groove may have a thickness of 1.7 μm to 1.8 μm.

The insulating layer positioned on the side portion 22 of the side defective groove may have a thickness of 1.5 μm or more and less than 4.0 μm, and the insulating layer positioned on the bottom portion of the side defective groove may have a thickness of 4.0 μm to 6.0 μm. More specifically, the insulating layer positioned on the side portion 22 of the side defective groove may have a thickness of 1.5 μm to 3.0 μm, and the insulating layer positioned on the bottom portion of the side defective groove may have a thickness of 5.0 μm to 6.0 μm.

In addition, the insulating layer positioned on the side portion 22 of the bottom defective groove may have a thickness of 2.0 μm or more and less than 5.0 μm, and the insulating layer positioned on the bottom portion 11 of the bottom defective groove may have a thickness of 5.0 μm to 10.0 μm. More specifically, the insulating layer positioned on the side portion 22 of the bottom defective groove may have a thickness of 2.0 μm to 3.0 μm, and the insulating layer positioned on the bottom portion 11 of the bottom defective groove may have a thickness of 7.0 μm to 9.0 μm.

The bottom portion 21 and the side portion 22 of the groove are illustrated in detail in FIG. 2. More specifically, the bottom portion 21 of the groove refers to a depth portion of 0.7 or more of the entire depth (H) of the groove, and the side portion 22 of the groove refers to a depth portion of less than 0.7 of the entire depth (H) of the groove.

The steel sheet is divided into several zones in a rolling vertical direction, and the insulating layer may be formed to have a corresponding thickness in each zone according to the thickness of the metal oxide layer 30 positioned on the groove included in each zone. Since the thickness of the metal oxide layer 30 is changed by process variables, it is not rapidly changed along the rolling vertical direction of the steel sheet. Therefore, even if the steel sheet is divided into several zones in the rolling vertical direction and even if the thicknesses of the insulating layers 40 positioned on the grooves included in respective zones are the same, there is no problem. In this case, the thickness of the insulating layer 40 is determined according to the thickness of the metal oxide layer 30 of an arbitrary groove in the zones.

In addition, the steel sheet is divided into several zones in a rolling vertical direction, and the insulating layer may be formed to have a corresponding thickness in each zone according to the thickness of the metal oxide layer positioned on the groove included in each zone. Even if the steel sheet is divided into several zones in the rolling direction and even if the thicknesses of the insulating layers 40 positioned on the grooves included in respective zones are the same, there is no problem. In this case, the thickness of the insulating layer 40 is determined according to the thickness of the metal oxide layer 30 of an arbitrary groove in the zones.

Figure 6:
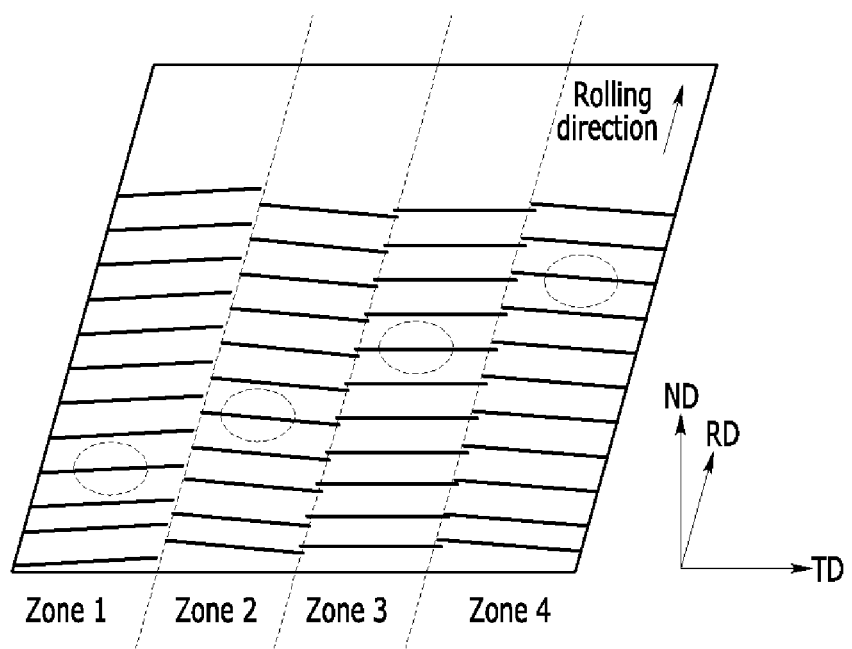
FIG. 6 illustrates a case of dividing a zone in a rolling vertical direction.
Figure 7:
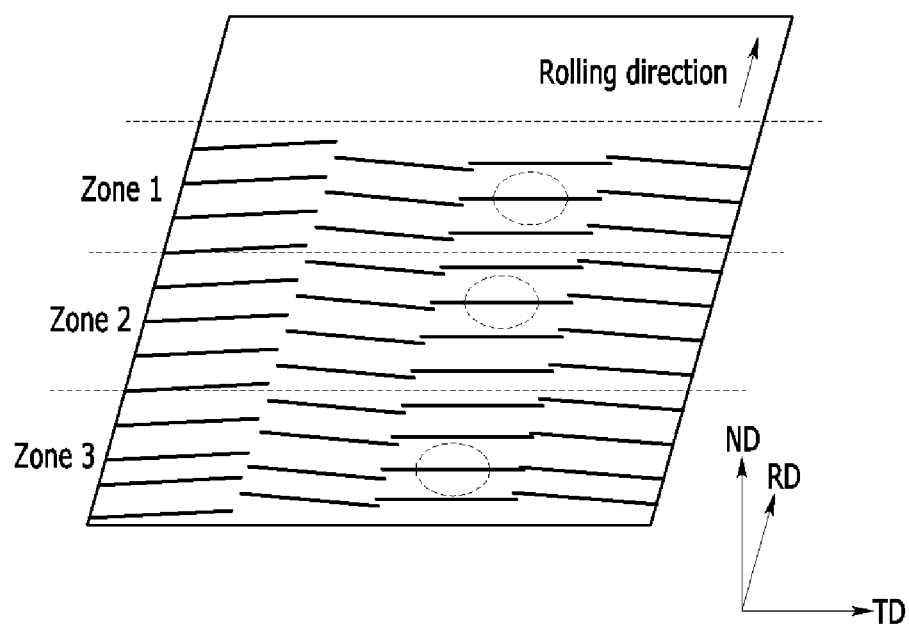
FIG. 7 illustrates a case of dividing a zone in a rolling direction.

FIG. 6 and FIG. 7 show cases in which the insulating layer 40 is divided into the zones to have the corresponding thicknesses in the rolling vertical direction and the rolling direction. By selecting an arbitrary groove (indicated by a dotted line circle) in the zone, a thickness of the metal oxide layer on the groove (indicated by the dotted line circle) may be measured to be reflected in thicknesses of the insulating layers 40 of all grooves in the zone.

The steel sheet may be divided into several zones in the rolling vertical direction or the rolling direction, and the insulating layer may be formed to have the corresponding thickness in each zone according to the thickness of the metal oxide layer positioned on the groove included in each zone.

Among the grooves of the entire steel sheet, the defective grooves may be 20 to 80%. As described above, it is most ideal that no defective grooves occur, but the defective grooves may occur in the above-described range in an actual process. In this case, the defective grooves mean a sum of the bottom defective grooves and the side defective grooves.

The grooves may be linearly formed, and 2 to 10 grooves may be intermittently positioned in the rolling vertical direction. FIG. 1 illustrates a case in which four grooves are intermittently formed.

The grooves may be linearly formed, and may form an angle of 75 to 88° with respect to the rolling vertical direction. Iron loss may be further improved by forming an appropriate angle.

The depth of the groove may be 3 to 30 μm. The iron loss may be further improved by forming an appropriate depth.

A manufacturing method of a grain-orient electrical steel sheet according to an embodiment of the present invention includes: manufacturing a cold-rolled sheet; forming a groove including a bottom portion and a side portion on a surface of the cold rolled sheet; applying an annealing separator to the cold-rolled sheet and annealing it at a high temperature to form a metal oxide layer; measuring a thickness of the metal oxide layer positioned on the bottom portion and the side portion of the groove; and forming an insulating layer by adjusting and applying viscosity of an insulating layer-forming composition according to the measured thickness of the metal oxide layer.

First, a cold rolled sheet is manufactured. The alloy components and the manufacturing method of the grain-oriented electrical steel sheet may be variously applied to alloy compositions and a manufacturing method of the cold-rolled sheet, and the present invention is not particularly limited thereto.

For example, the cold-rolled sheet may include: based on the entire composition of 100 wt %, 0 at 0.0020 to 0.0080 wt %, Si at 2.5 to 6.0 wt %, C at 0.02 to 0.10 wt %, Al at 0.02 to 0.04 wt %, Mn at 0.05 to 0.20 wt %, Na at 0.002 to 0.012 wt %, S at 0.001 wt % to 0.010 wt %, P at 0.01 to 0.08 wt %, and the balance of Fe and impurities (a total weight of Ni, Cr, Sb, and a rare earth metal is within 0.1 wt %).

Next, a groove including a bottom portion and a side portion is formed on a surface of the cold-rolled sheet.

A method of forming the groove may be variously provided, and is not particularly limited. For example, the groove may be formed through laser irradiation. In this case, a laser beam with an average output of several kilowatts may be used. Since the laser beam is widely known, a detailed description thereof will be omitted.

The cold-rolled sheet is applied with the annealing separator and then annealed at a high temperature to form a metal oxide layer. Since the annealing separator and the annealing at the high temperature are widely known in the field of the grain-oriented electrical steel sheet, detailed descriptions thereof will be omitted. For example, as the annealing separator, MgO may be used. During the annealing at the high temperature, MgO may be combined with the oxide layer on the surface of the steel sheet to form forsterite.

Thicknesses of the metal oxide layers positioned on the bottom and side portions of the groove are measured. At this step, the grooves are classified into the normal groove and the defective groove. The defective grooves may be further specifically classified into the side defective groove and the bottom defective groove.

The thickness measurement method may be provided in various ways without limitation, and as an example, an optical microscope method, an electron microscope method, a GDS method, and the like may be used.

Next, the insulating layer is formed by adjusting and applying the viscosity of the insulating layer-forming composition according to the measured thickness of the metal oxide layer.

Specifically, in the forming of the insulating layer, in the case of the normal groove in which the thicknesses of the metal oxide layers positioned on the bottom and side portions exceed 0.5 μm, the viscosity of the insulating layer-forming composition may be adjusted to be more than 80 cps, and in the case of the defective groove having the defective portion in which the thicknesses of the metal oxide layers positioned on the side or bottom portions are 0.5 μm or less, the viscosity of the insulating layer-forming composition may be adjusted to be 80 cps or less.

Various methods may be used to adjust the viscosity of the insulating layer-forming composition. For example, the viscosity may be adjusted by adjusting an amount of solvent added in the composition. Alternatively, the viscosity may be adjusted by changing constituent elements in the composition. That is, inorganic particles may be included in the composition, and in this case, the viscosity may be adjusted by adjusting a specific area of the inorganic particles. In addition, various methods may be used without limitation.

The above-mentioned viscosity is a viscosity at a temperature of 25° C.

When the viscosity is low, it is possible to form a thick insulating layer on the groove. Conversely, when the viscosity is high, it is possible to form a thin insulating layer on the groove. In the embodiment of the present invention, the thickness of the insulating layer may be adjusted by using the viscosity of the insulating layer-forming composition. Since the thickness of the insulating layer is the same as described above, a redundant description thereof will be omitted.

In the case of the side defective groove having a thickness of 0.5 μm or less of the metal oxide layer positioned on the side portion, the viscosity of the insulating layer-forming composition may be adjusted to be 20 to 80 cps, and in the case of the bottom defective groove having a thickness of 0.5 μm or less of the metal oxide layer positioned on the bottom portion, the viscosity of the insulating layer-forming composition may be adjusted to be less than 20 cps.

In the measuring of the thickness of the metal oxide layer, it is possible to divide the zones in the rolling vertical direction to measure the thickness, and in the forming of the insulating layer, it is possible to divide the zones in the rolling vertical direction to apply the insulating layer-forming composition.

In the measuring of the thickness of the metal oxide layer, it is possible to divide the zones in the rolling direction to measure the thickness, and in the forming of the insulating layer, it is possible to divide the zones in the rolling direction to apply the insulating layer-forming composition.

Various types of the insulating layer-forming composition may be used without limitation. For example, the insulating layer-forming composition including silica and metal phosphate may be used.

Hereinafter, the present invention will be described in more detail through examples. However, the examples are only for illustrating the present invention, and the present invention is not limited thereto.

Example 1

A cold-rolled sheet with a thickness of 0.27 mm was prepared. The cold-rolled sheet was irradiated with a 1.5 kW Gaussian mode continuous wave laser to form a groove with a depth of 15 μm. After the formation of the groove, decarburizing, nitriding, and annealing were performed, MgO was applied, and high temperature annealing was performed.

While performing the above processes, the process was performed so that all metal oxide layers formed on the grooves in the specimen had defects at the bottom portions thereof.

Next, the viscosity was adjusted to be 15 cps, and the insulating layer-forming composition containing silica and Al phosphate was applied to form the insulating layer.

The thickness of the insulating layer, the iron loss ($W_{17/50}$), and the leakage current were measured and are shown in Table 1 below.

Example 2

It was realized in the same manner as in Example 1, but the process was performed so that all metal oxide layers formed on the grooves in the specimen had defects at the side portions thereof.

The viscosity was adjusted to be 50 cps to form the insulating layer.

The thickness of the insulating layer, the iron loss ($W_{17/50}$), and the leakage current were measured and are shown in Table 1 below.

Comparative Example 1

It was realized in the same manner as in Example 1, but the viscosity was adjusted to be 100 cps to form the insulating layer.

The thickness of the insulating layer, the iron loss ($W_{17/50}$), and the leakage current were measured and are shown in Table 1 below.

TABLE 1

|  | Insulating layer thickness (μm) | | Iron loss | Leakage |
| --- | --- | --- | --- | --- |
|  | Side portion | Bottom portion | ($W_{17/50}$, W/kg) | current (mA) |
| Example 1 (bottom defective groove) | 2.25 | 9.0 | 0.72 | 0 |
| Example 2 (side defective groove) | 1.5 | 6.0 | 0.73 | 3 |
| Comparative Example 1 (bottom defective groove) | 0.8 | 1.2 | 0.76 | 600 |

As shown in Table 1, even if the bottom defective groove and the side defective groove are formed, when the insulating layer is formed with an appropriate thickness, it can be confirmed that the iron loss is excellent and the insulating property is excellent. Meanwhile, as in Comparative Example 1, even though the bottom defective groove was formed, when the insulating layer was formed thin, it can be seen that the iron loss and the insulating property are deteriorated.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the above-described embodiments are for illustrative purposes only, and the scope of the present invention is not limited thereto.

DESCRIPTION OF SYMBOLS

10: grain-oriented electrical steel sheet
20: groove
21: bottom portion
22: side portion
30: metal oxide layer
40: insulating layer

The invention claimed is:

1. A grain-oriented electrical steel sheet, comprising:
grooves including a bottom portion and a side portion and positioned on a surface of the electrical steel sheets;
a metal oxide layer positioned on the grooves and
an insulating layer positioned on the metal oxide layer,
wherein the grooves include normal grooves and defective grooves,
thicknesses of the metal oxide layer positioned on the bottom portion and the side portion in the normal grooves exceed 0.5 μm, and thicknesses of the metal oxide layer positioned on the bottom portion and the side portion in the defective grooves are 0.5 μm or less,
the insulating layer positioned on the normal grooves has a thickness of 0.5 μm or more and less than 1.5 μm,
the insulating layer positioned on the defective grooves has a thickness of 1.5 to 10 μm,
the bottom portion of the grooves is a depth portion of 0.7 or more of an entire depth of the grooves, and the side portion of the grooves is a depth portion of less than 0.7 of the entire depth of the grooves,
the thicknesses of the insulating layer positioned on the defective grooves are thicker than the thicknesses of the insulating layer positioned on the normal grooves, the defective grooves are 10 to 80% of all the grooves of the steel sheet, and the thickness of the insulating layer on the side portion is less than 20% of the entire depth and the thickness of the insulating layer on the bottom portion is 20 to 80% of the entire depth.

2. The grain-oriented electrical steel sheet of claim 1, wherein the defective grooves include side defective grooves having a defective portion on the side portion and bottom defective grooves having a defective portion on the bottom portion, the insulating layer positioned on the side defective grooves has a thickness of 1.5 to 6 µm, and the insulating layer positioned on the bottom defective grooves has a thickness of 2.0 to 10 µm.

3. The grain-oriented electrical steel sheet of claim 1, wherein the insulating layer positioned on the side portion of the normal grooves has a thickness of 0.5 µm to 2.0 µm, and the insulating layer positioned on the bottom portion of the normal grooves has a thickness of 1.0 µm to 4.0 µm.

4. The grain-oriented electrical steel sheet of claim 2, wherein the insulating layer positioned on the side portion of the side defective grooves has a thickness of 1.5 µm or more and less than 4.0 µm, and the insulating layer positioned on the bottom portion of the side defective grooves has a thickness of 4.0 µm to 6.0 µm.

5. The grain-oriented electrical steel sheet of claim 2, wherein the insulating layer positioned on the side portion of the bottom defective grooves has a thickness of 2.0 µm or more and less than 5.0 µm, and the insulating layer positioned on the bottom portion of the bottom defective grooves has a thickness of 5.0 µm to 10.0 µm.

6. The grain-oriented electrical steel sheet of claim 1, wherein the steel sheet is divided into several zones in a rolling vertical direction, and the insulating layer is formed to have a corresponding thickness in each zone according to a thickness of a metal oxide layer positioned on grooves included in each zone.

7. The grain-oriented electrical steel sheet of claim 1, wherein the steel sheet is divided into several zones in a rolling direction, and the insulating layer is formed to have a corresponding thickness in each zone according to a thickness of a metal oxide layer positioned on grooves included in each zone.

8. The grain-oriented electrical steel sheet of claim 1, wherein the grooves are linearly formed, and 2 to 10 grooves are intermittently positioned in a rolling vertical direction.

9. The grain-oriented electrical steel sheet of claim 1, wherein the grooves are linearly formed, and form an angle of 75 to 88° with respect to a rolling vertical direction.

10. The grain-oriented electrical steel sheet of claim 1, wherein a depth of the grooves is 3 to 30 µm.

11. The grain-oriented electrical steel sheet of claim 1, wherein the metal oxide layer includes forsterite.

12. The grain-oriented electrical steel sheet of claim 1, wherein the metal oxide layer extends in a region of the electrical steel sheet between the grooves.

13. A grain-oriented electrical steel sheet, comprising:

grooves including a bottom portion and a side portion and positioned on a surface of the electrical steel sheet;

a metal oxide layer extending on the surface of the electrical steel sheet into regions of the grooves; and an insulating layer positioned on the metal oxide layer, and extending on the surface of the electrical steel sheet into the regions of the grooves, wherein the grooves include normal grooves and defective grooves, thicknesses of the metal oxide layer positioned on the bottom portion and the side portion in the normal grooves exceed 0.5 µm, and thicknesses of the metal oxide layer positioned on the bottom portion and the side portion in the defective grooves are 0.5 µm or less, the insulating layer positioned on the normal grooves has a thickness of 0.5 µm or more and less than 1.5 µm, the insulating layer positioned on the defective grooves has a thickness of 1.5 to 10 µm, the bottom portion of the grooves is a depth portion of 0.7 or more of an entire depth of the grooves, and the side portion of the grooves is a depth portion of less than 0.7 of the entire depth of the grooves, the thicknesses of the insulating layer positioned on the defective grooves are thicker than the thicknesses of the insulating layer positioned on the normal grooves, and the thickness of the insulating layer on the side portion is less than 20% of the entire depth and the thickness of the insulating layer on the bottom portion is 20 to 80% of the entire depth.

14. The grain-oriented electrical steel sheet of claim 13, wherein the metal oxide layer includes forsterite.

15. The grain-oriented electrical steel sheet of claim 13, wherein the metal oxide layer extends in a region of the electrical steel sheet between the grooves.

* * * * *